United States Patent
Herrmann et al.

(10) Patent No.: US 11,998,417 B2
(45) Date of Patent: Jun. 4, 2024

(54) PROCESS FOR PRODUCING A SURFACE-MODIFIED DENTAL ARTICLE

(71) Applicant: Solventum Intellectual Properties Company, Maplewood, MN (US)

(72) Inventors: Andreas G. Herrmann, Munich (DE); Gioacchino Raia, Tuerkenfeld (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 18/011,356

(22) PCT Filed: Jun. 16, 2021

(86) PCT No.: PCT/IB2021/055339
§ 371 (c)(1),
(2) Date: Dec. 19, 2022

(87) PCT Pub. No.: WO2022/003470
PCT Pub. Date: Jan. 6, 2022

(65) Prior Publication Data
US 2023/0225829 A1    Jul. 20, 2023

(30) Foreign Application Priority Data
Jul. 3, 2020 (EP) .................................... 20183844

(51) Int. Cl.
*A61C 5/77* (2017.01)
(52) U.S. Cl.
CPC ...................... *A61C 5/77* (2017.02)
(58) Field of Classification Search
None
See application file for complete search history.

(56) References Cited

U.S. PATENT DOCUMENTS 3,541,068 A    11/1970  Taylor
4,259,075 A     3/1981  Yamauchi et al.
(Continued)

FOREIGN PATENT DOCUMENTS

EP        0115058 B1    1/1988
EP        0712622 81    9/1999
(Continued)

OTHER PUBLICATIONS

Extended European Search Report received for EP Application No. 20183844.8, dated Mar. 19, 2021, 2 pages.
(Continued)

*Primary Examiner* — Cachet I Proctor
(74) *Attorney, Agent, or Firm* — Kevin Weber

(57) ABSTRACT

The invention relates to a process of producing a surface-modified non-metallic dental article, the process comprising the steps of providing a non-metallic dental article having an outer and an inner surface, applying a curable composition on the inner surface of the dental article (to form a layer of the curable composition on the inner surface), applying particles on the curable composition located on the inner surface of the dental article to achieve a surface roughness Ra of 1 to 30 μm, curing the applied curable composition, the chemical composition of the curable composition being different from the chemical composition of the dental article. The invention also relates to a surface-modified non-metallic dental article obtained or obtainable by such a process and a kit of parts comprising such a surface-modified non-metallic dental article and a dental cement.

11 Claims, 1 Drawing Sheet

1

2

3

(56) References Cited

U.S. PATENT DOCUMENTS

| | | |
|---|---|---|
| 4,499,251 A | 2/1985 | Omura et al. |
| 4,537,940 A | 8/1985 | Omura et al. |
| 4,539,382 A | 9/1985 | Omura et al. |
| 4,544,742 A | 10/1985 | Schmitt et al. |
| 4,642,126 A | 2/1987 | Zador et al. |
| 4,652,274 A | 3/1987 | Boettcher et al. |
| 4,795,823 A | 1/1989 | Schmitt et al. |
| 4,872,936 A | 10/1989 | Engelbrecht |
| 5,104,319 A * | 4/1992 | Evans ............... C23C 4/11 433/223 |
| 5,130,347 A | 7/1992 | Mitra |
| 5,530,038 A | 6/1996 | Yamamoto et al. |
| 6,221,931 B1 | 4/2001 | Sakuma et al. |
| 6,458,868 B1 | 10/2002 | Okada et al. |
| 6,730,156 B1 | 5/2004 | Windisch et al. |
| 10,342,644 B2 * | 7/2019 | Nordin ............ A61C 8/0086 |
| 2003/0008967 A1 | 1/2003 | Hecht et al. |
| 2004/0206932 A1 | 10/2004 | Abuelyaman |
| 2007/0015114 A1 | 1/2007 | Ito |
| 2009/0215010 A1 * | 8/2009 | Tagami ............ A61C 13/0024 433/223 |
| 2013/0216787 A1 * | 8/2013 | Yeh ................. C04B 41/4578 428/149 |
| 2020/0206092 A1 | 7/2020 | Herrmann et al. |

FOREIGN PATENT DOCUMENTS

| | | | |
|---|---|---|---|
| EP | 1510184 A2 * | 3/2005 | ............ A61C 5/00 |
| EP | 1510184 A2 | 3/2005 | |
| EP | 1051961 B1 | 2/2006 | |
| JP | 2012085857 A | 5/2012 | |
| JP | 2019043921 A | 3/2019 | |
| JP | 2019123690 A | 7/2019 | |
| WO | 2018231583 A1 | 12/2018 | |
| WO | 2021156737 A1 | 8/2021 | |

OTHER PUBLICATIONS

International Search Report received for PCT Application No. PCT/IB2021/055339, dated Nov. 15, 2021, 7 pages.

Partial European Search Report received for EP Application No. 20183844.8, dated Dec. 16, 2020, 2 pages.

* cited by examiner

PROCESS FOR PRODUCING A SURFACE-MODIFIED DENTAL ARTICLE

CROSS REFERENCE TO RELATED APPLICATIONS

This application is a national stage filing under 35 U.S.C. 371 of PCT/IB2021/055339, filed Jun. 16, 2021, which claims the benefit of European Application No. 20183844.8, filed Jul. 3, 2020, the disclosures of which are incorporated by reference in their entireties herein.

FIELD OF THE INVENTION

The invention relates to a process for producing a surface-modified non-metallic dental article, in particular a surface-modified non-metallic dental restoration, a surface-modified non-metallic dental article obtained by such a process and its use thereof. The surface-modified non-metallic dental article can be used in particular for treating or restoring a tooth in the mouth of a patient more easily.

BACKGROUND

The fixation of a dental restoration, in particular of a dental composite crown, is not easy and typically requires a couple of steps, including the use of an adequate dental cement.

The success of the fixation typically depends on the bonding strength of the dental cement to the surface of the dental restoration and to the surface of the tooth. The ability of a dental cement to connect chemically with the surface and a good mechanically interlock of the dental cement in retentions of the surface typically leads to a high bonding strength.

For enhancing the bonding strength on the dental cement-restoration-interface, the inner surface of the dental restoration is typically roughened, e.g. by sandblasting. Thus, a higher surface roughness and the ability of the surface to connect chemically with the cement are sometimes desired.

Moreover, a more robust cementation process for dental composite crowns by the use of more moisture tolerant cements (e.g. RMGIC) is sometimes advantageous.

In this respect, US 2007/0015114 A1 (Ito) describes a cementing object (such as a dental crown) to be bonded to a mating cementing object (such as a tooth surface) via a resin-based cement, wherein the cementing object comprises a cementing component formed by a metal or an alloy and which has a cementing surface, and powder particles fixedly attached to said cementing component with the powder particles being partially embedded into the cementing surface (press-fitted), wherein a resin is coating the surface of each particle except the part which is embedded into the cementing surface. It is outlined that the particles are coated with a resin formed by heat-treating a mixture of particles and a resin powder. Due to the resin-coating of the particle surface, the surface roughness is reduced.

US 2013/216787 A1 (Yeh et al.) relates to a ceramic body with increased surface roughness comprising a ceramic body and a composite porous layer formed from a material comprising a plurality of first and second ceramic particles wherein at least some of the second ceramic particles are dispersed within the composite porous layer.

However, the fixing of non-metallic dental restorations having a rather hydrophobic surface to the hydrophilic surface of a tooth is not trivial.

SUMMARY OF INVENTION

Generally, there is a need for a process allowing an easy surface-modification of a dental article.

More precisely, there is a need for a process which allows the producing of a dental article, which can be fixed to a surface, e.g. the surface of a tooth, more easily.

In particular, there is a need for a process which allows the fixing of a non-metallic dental article having a hydrophobic surface to a hydrophilic tooth surface by using a dental cement.

One or more of the above objectives are addressed by the invention.

In one embodiment the invention features a process of producing a surface-modified non-metallic dental article, the process comprising the steps of providing a non-metallic dental article having an outer and an inner surface, applying a curable composition on the inner surface of the dental article (to form a layer of the curable composition on the inner surface), applying particles on the curable composition located on the inner surface of the dental article to achieve a surface roughness Ra of 1 to 30 µm, curing the applied curable composition, the chemical composition of the curable composition being different from the chemical composition of the dental article.

In another embodiment, the invention relates to a non-metallic dental article obtained or obtainable by such a process, in particular for use in a process of treating or restoring a tooth in the mouth of a patient.

A further embodiment of the invention is directed to a kit of parts comprising the non-metallic dental article obtained or obtainable according to the process described in the present text and a dental cement.

A further embodiment of the invention is directed to a kit of parts comprising a not surface-modified non-metallic dental article or a dental milling block for producing a not surface-modified non-metallic dental article, a curable composition, a powder composition comprising particles, optionally an applicator for the curable composition, and optionally an applicator for the powder composition, wherein the dental article, the curable composition, the particles and the dental cement are as described in the present text.

The invention is also directed to the use of a curable composition for fixing particles to the inner surface of a non-metallic dental article comprising an inner and an outer surface to obtain a surface roughness Ra of 1 to 30 µm or 2 to 30 µm or 5 to 30 µm, wherein the chemical composition of the curable composition is different from the chemical composition of the non-metallic dental article, and wherein the curable composition, the particles and the non-metallic dental article are as described in the present text.

Unless defined differently, for this description the following terms shall have the given meaning:

The term "compound" or "component" is a chemical substance which has a certain molecular identity or is made of a mixture of such substances, e.g., polymeric substances.

A "hardenable or curable or polymerizable component" is any component which can be cured or solidified in the presence of a photo-initiator by radiation-induced polymerization. A hardenable component may contain only one, two, three or more polymerizable groups. Typical examples of polymerizable groups include unsaturated carbon groups, such as a vinyl group being present i.a. in a (methyl)acrylate group.

As used herein, "(meth)acryl" is a shorthand term referring to "acryl" and/or "methacryl". For example, a "(meth)

acryloxy" group is a shorthand term referring to either an acryloxy group (i.e., $CH_2=CH-C(O)-O-$) and/or a methacryloxy group (i.e., $CH_2=C(CH_3)-C(O)-O-$).

As used herein, "hardening" or "curing" a composition are used interchangeably and refer to polymerization and/or crosslinking reactions including, for example, photo-polymerization reactions and chemical-polymerization techniques (e. g., ionic reactions or chemical reactions forming radicals effective to polymerize ethylenically unsaturated compounds) involving one or more materials included in the composition.

A "photo-initiator" is a substance being able to start or initiate the curing process of a hardenable composition in the presence of radiation, in particular light with a wavelength in the range of 330 to 495 nm.

"Dental article" means an article which is to be used in the dental field, especially as or for producing a dental restoration.

A dental article has typically two different surface portions, an outer surface and an inner surface. The outer surface is the surface which is typically not in permanent contact with the surface of a tooth. In contrast thereto, the inner surface is the surface which is used for attaching or fixing the dental article to a tooth. If the dental article has the shape of a dental crown, the inner surface has typically a concave shape, whereas the outer surface has typically a convex shape. A dental article should not contain components which are detrimental to the patient's health and thus free of hazardous and toxic components being able to migrate out of the dental or orthodontic article.

"Dental restoration" means dental articles which are used for restoring a tooth to be treated. Examples of dental restorations include crowns, bridges, inlays, onlays, veneers, facings, copings, crown and bridged framework, and parts thereof.

"Glass-ionomer cement" means a dental cement which cures by the reaction of an acid-reactive glass and a polyacid, typically in the presence of a retarder and water. Glass ionomer cements typically contain the following components: acid-reactive filler, polyacid, water, and complexing agent, but no curable components.

"Resin-modified glass-ionomer cement" means a hardenable dental material comprising acid-reactive glass, polyacid, water, polymerizable components and initiator. Resin modified glass ionomer cements undergo a twofold curing reaction, a glass ionomer acid-base based cement reaction and a polymerization of typically (meth)acrylate based monomers.

"Adhesive resin cement" means a hardenable dental material which cures by radical polymerization of polymerizable components (but not by a glass ionomer cement reaction). An adhesive resin cement requires a pre-treatment of the hard dental surfaces to effect adhesion. In contrast to resin modified glass ionomer cements, an adhesive resin cement does not contain added water.

A "self-adhesive resin cement" is an adhesive resin cement which in addition contains acidic components and thus does not require a pre-treatment of the hard dental surfaces to effect adhesion. In contrast to resin modified glass ionomer cements, adhesive resin cements and self-adhesive resin cements typically only cure by polymerization reaction.

"Temporary cement" means a cement composition which is based on a curing reaction of a zinc component (e.g. ZnO) with a phosphate, polycarboxylate or eugenol component. The respective cements are known as zinc phosphate cement, zinc oxide eugenol cement, zinc polycarboxylate cement.

"Glass" means an inorganic non-metallic amorphous material which is thermodynamically an under-cooled and frozen melt. Glass refers to a hard, brittle, transparent solid. Typical examples include soda-lime glass and borosilicate glass. A glass is an inorganic product of fusion which has been cooled to a rigid condition without crystallizing. Most glasses contain silica as their main component and a certain amount of glass former.

"Ceramic" means an inorganic non-metallic material that is produced by application of heat. Ceramics are usually hard, porous and brittle and, in contrast to glasses or glass ceramics, display an essentially purely crystalline structure.

"Crystalline" means a solid composed of atoms arranged in a three-dimensional periodic pattern (i.e., has long range crystal structure as determined by X-ray diffraction). Crystal structures include tetragonal, monoclinic, cubic zirconia and mixtures thereof.

"Glass-ceramic" means an inorganic non-metallic material where one or more crystalline phases are surrounded by a glassy phase so that the material comprises a glass material and a ceramic material in a combination or mixture. It is formed as a glass, and then crystallize by a nucleation and crystallization heat treatment. Glass ceramics may refer e.g. to a mixture of lithium-, silicon-, and aluminium-oxides.

A "plastic material" means synthetic or semi-synthetic organic compounds that are malleable and so can be molded into solid objects. Plastics are typically organic polymers of high molecular mass and often contain other substances.

A "particle" means a substance being a solid having a shape which can be geometrically determined. The shape can be regular or irregular. Particles can typically be analysed with respect to e.g.

particle size and particle size distribution.

A "resin" means a highly viscous composition composed of a mixture of organic compounds.

The particle size (d50) of a powder can be obtained from the cumulative curve of the grain size distribution. Respective measurements can be done using commercially available granulometers (e.g. Malvern Mastersizer 2000). "D" represents the diameter of powder particles and "50" refers to the volume percentage of the particles. Sometimes, the 50% is also expressed as "0.5". For example, "(d50)=1 µm" means that 50% of the particles have a size of 1 µm or less.

"Partially embedded" means that the particles are not fully embedded in a curable composition but partially remain present on the cured surface of the composition after curing. As a result, the surface roughness of the cured composition is higher compared to the surface of the cured composition which has not been surface-treated as described in the present text.

By "dental milling block" is meant a solid block (3-dim article) of material from which a dental article, dental workpiece, dental support structure or dental restoration can and typically is to be machined in any subtractive process, e.g. besides milling also by grinding, drilling etc.

A dental mill blank has a geometrically defined shape and comprises at least one flat surface. A so-called "free form surface" is not regarded as "geometrically defined". In this respect the shape of a dental restoration (e.g. crown or bridge) itself is not regarded a dental mill blank.

"Ambient conditions" mean the conditions which the composition described in the present text is usually subjected to during storage and handling. Ambient conditions may, for example, be a pressure of 900 to 1,100 mbar, a temperature of 10 to 40° C. and a relative humidity of 10 to 100%. In the laboratory ambient conditions are typically adjusted to 20 to 25° C. and 1,000 to 1,025 mbar (at maritime level).

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The terms "comprise" or "contain" and variations thereof do not have a limiting meaning where these terms appear in the description and claims. "Consisting essentially of" means that specific further components can be present, namely those which do not materially affect the essential characteristic of the article or composition. "Consisting of" means that no further components should be present. The term "comprise" shall include also the terms "consist essentially of" and "consists of".

A composition is "essentially or substantially free of" a certain component, if the composition does not contain said component as an essential feature. Thus, said component is not wilfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

DETAILED DESCRIPTION

Figure 1:
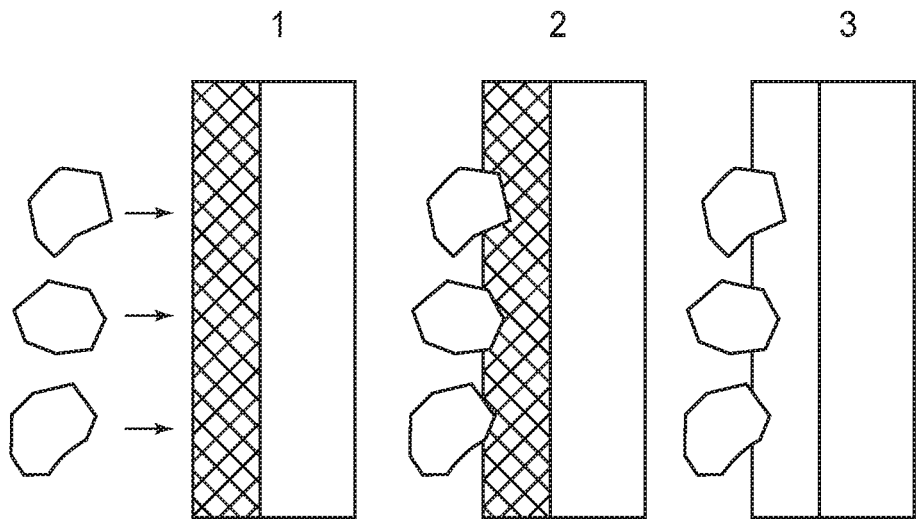
FIG. 1 shows a schematic view of the process according to the invention.

It has been found that the process and kit or parts described in the present text has a couple of advantageous properties.

The process described in the present text allows an easy surface-modification of a non-metallic dental article.

A layer of a curable composition is applied to only a part of the surface of the non-metallic dental article. This layer of curable composition can be used for a surface-modification step involving the step of treating with, modifying with or embedding particles into this layer, at least partially. The particles are embedded into this layer of the curable composition before a curing step is done.

The curing of the treated surface of the dental article afterwards results in a non-metallic dental article comprising a surface portion with particles incorporated and fixed therein.

Not all particles are fully embedded into the curable composition, a portion of the particles will be embedded only partially. This results in an increase of the surface roughness.

The surface of the non-metallic dental article is modified in that the surface now contains additional particles, which typically have physical and/or chemical properties being different from a filler material which is typically present in the material the non-metallic dental article is made of.

By selecting the particles and the treatment conditions, the surface roughness and/or the surface properties of the dental article can be adjusted easily.

A higher surface roughness is often considered to be advantageous as more retention elements are available on the surface. This typically allows for a better and more robust adhesion or fixation when the non-metallic dental article is fixed to a surface of a tooth by using an adequate adhesive composition or cement.

An additional or separate roughening step of the surface of the non-metallic dental article is not required anymore.

The process described in the present text cannot only be used for producing non-metallic dental articles on an industrial scale but also for producing individualized single dental articles, e.g. for producing dental restorations chairside or in a dental lab.

As a portion of the particles is only partly embedded into the surface, the remaining portion of the particles is available for a further interaction with a different medium, e.g. an adhesive composition or dental cement.

Depending on the particles used, the process described in the present text allows the surface-modification of the surface of the non-metallic dental article in a variety of aspects.

For example, particles can be used which can chemically interact with components being present in the dental cement which is typically used for fixing the dental article to a surface, in particular the surface of a tooth.

This opens the opportunity to use a variety of different adhesive compositions or dental cements for the fixing or adhering of the non-metallic dental article to the surface of a tooth, including the use of glass-ionomer cements and resin-modified glass-ionomer cements.

By working according to the process described in the present text, the overall time for the surface modification can also be reduced.

It is also possible to use particles which help to improve or modify the mechanical properties of the non-metallic dental article.

This is e.g. in contrast to the prior art (e.g. US 2007/0015114 A1) where resin-coated particles are used for modifying the surface of a cementing object. After the surface-modification step, the cementing object has a resin-coated surface formed by the resin coat provided by the surface of the resin-coated particles which are not embedded into the cementing surface. In US 2007/0015114 A1 no values for surface roughness are provided, but the resin-coating of the particles flattens the surface-roughness and the resin-coated particles themselves are no longer available for a chemical reaction with a dental cement, if desired.

The process and dental articles described in the present text are a breakthrough in the dental area, since so far, non-metallic dental articles composed of e.g. a composite material could not be cemented with e.g. a glass-ionomer-cement or a resin-modified glass-ionomer cement at all.

The option to have a process at hand which enables the practitioner to use e.g. a glass ionomer cement for the fixing of a dental composite crown to the surface of a tooth is advantageous for a variety of reasons. Glass ionomer cements are typically cheaper than self-adhesive cements. Further, they are typically more moisture tolerant, and can be applied more easily.

The invention relates to a process of producing a surface-modified non-metallic dental article. This process comprises a couple of steps.

A non-metallic dental article with an outer and an inner surface is provided first. The dental article is composed of a non-metallic material.

The dental article is an article having a size and shape for use in the dental field. The dental article comprises two surfaces, an inner surface for attaching or fixing the dental article to the surface of a tooth and an outer surface, which typically remains visible after the treatment.

The non-metallic dental article can be composed of different kinds of materials, including a composite material, a ceramic material, a glass-ceramic material and a plastic material.

Ceramic materials which can be used include in particular zirconia and alumina. As zirconia materials in particular stabilized zirconia is useful, e.g. zirconia containing 3 to 5 mol % of a stabilizer such as yttria, magnesia or cerium oxide.

Glass-ceramic materials include lithium silicate and lithium disilicate glass ceramic material.

A lithium silicate glass ceramic is a material which typically comprises quartz, lithium dioxide, phosphor oxide and alumina. A lithium silicate glass ceramic may comprise lithium metasilicate crystals ($Li_2SiO_3$), lithium disilicate crystals ($Li_2Si_2O_5$) or a mixture of both crystals. Lithium silicate glass ceramic comprising mainly lithium metasilicate crystals have typically a low strength and toughness compared to lithium silicate glass ceramic comprising mainly lithium disilicate crystals. Lithium silicate glass ceramic comprising mainly lithium metasilicate crystals can typically be machined easily. After a machining step, the material can be converted into a lithium disilicate glass ceramic material by a heating step.

A lithium disilicate glass ceramic is a material comprising mainly lithium disilicate crystals (e.g. content of crystalline lithium disilicate phase above 50 or above 55 or above 60 or above 65 vol.-%; typical ranges include 50 to 90 or from 55 to 85 or 60 to 80 vol.-%).

Plastic materials include thermoplastic or thermoset resins, polymers, copolymers, or compounds such as, polyacrylate, polyamide, polyaryletherketone, polyetheretherketone (also known as PEEK), polyetherimide, polyketone, polysulfone, ultrahigh molecular weight polyethylene polyetherketoneketone (also known as PEKK), and polyphenylene sulfide (also known as PPS) and other formulations, mixtures or mixtures thereof which may also include a filler.

Composite materials typically comprise a mixture of (meth)acrylate components, filler(s), initiator(s) and additive(s), in particular in its cured form. Examples of composite materials which can be use are described e.g. in WO 2018/231583 A1 (3M).

In a further step, to the inner surface of the non-metallic dental article a curable composition is applied.

The curable composition should be able to adhere or bond to the surface of the non-metallic dental article to be treated. The bonding strength can be determined as described in the example section, e.g. by determining the shear bond strength.

The shear bond strength should ideally be not less than 5 MPa or not less than 10 MPa and is typically in the range of 5 to 20 MPa.

As curable composition dental adhesives, dental primers or dental cements can be used.

The treating or the application of the curable composition to the inner surface of the non-metallic dental article can be done by various means including spraying, painting, coating, dipping, or a combination of any of those means.

The amount of curable composition applied to the surface of the non-metallic dental article typically depends on the structure and shape of the non-metallic dental article and typically also on the viscosity of the curable composition used.

The thickness of the layer of the curable composition on the inner surface of the non-metallic dental article is typically in the range of 1 to 500 µm or 5 to 200 µm or 10 to 100 µm.

Applying a thicker layer may have a negative impact on the fitting of the non-metallic dental article to the surface of the tooth to be treated. Applying a thinner layer could make it difficult to properly fix the particles to be used for the surface-modification.

The chemical composition of the curable composition to be applied to the inner surface of the non-metallic dental article is different from the chemical composition the non-metallic dental article is made of.

The curable composition typically has a filler content of up to 70, or up to 60 or up to 50 or up to 40 or up to 30 or up to 20 or up to 10 wt. % of the weight of the curable composition.

The curable composition can typically be characterized by the following features alone or in combination:

viscosity: 0.1 to 400 Pa*s or 0.1 to 200 Pa*s or 0.1 to 100 Pa*s at 23° C. at a shear rate of 1 $s^{-1}$;

pH value: 0 to 9 or 1 to 8, if brought in contact with wet pH sensitive paper.

If desired, the properties can be measured as described in the example section.

In certain embodiments, using a curable composition with the following properties is sometimes preferred: viscosity: 0.1 to 100 Pa*s at 23° C. at a shear rate of 1 $s^{-1}$; pH value: 0 to 9, if brought in contact with wet pH sensitive paper.

The curable composition described in the present text is curable by either of the following means alone or in combination a) applying radiation, b) heat, c) self-curing.

In case of radiation, the wavelength is typically within a range of 330 to 495 nm or 405 to 495 nm.

In case of heat, the temperature is typically in a range of 50 to 200° C. or 50 to 100° C.

The application time (for heat and/or radiation) can range from a few seconds (e.g. 1 to 30 s) to a few minutes (e.g. 1 to 5 min).

Alternatively or in addition, the curable composition can be self-curing. In such a case, the curable composition is typically provided as a kit of parts comprising two parts, wherein the two parts contain components of a redox-initiator system separated from each other before use.

The curing of the curable composition by applying radiation is typically preferred.

The curable composition typically comprises curable (meth)acrylate components without acidic groups.

The molecular weight of the (meth)acrylate(s) is typically at least 130 or at least 200 or at least 300 g/mol. The molecular weight (Mw) of the (meth)acrylate(s) is typically in a range of 130 to 3,000 g/mol or 200 to 2,500 g/mol or 300 to 2,000 g/mol.

The (meth)acrylate(s) has free radically active functional groups and includes monomers, oligomers, and polymers having two or more ethylenically unsaturated groups.

Suitable polymerizable component(s) without acidic moiety(s) can be characterized by the following formula:

$$A_n BA_m$$

with A being an ethylenically unsaturated group attached to backbone B, such as a (meth)acryloyl moiety, B being selected from (i) linear or branched $C_1$ to $C_{12}$ alkyl, (ii) $C_6$ to $C_{12}$ aryl, optionally substituted with other functional groups (e.g. OH), or (iii) organic group having 4 to 20 carbon atoms bonded to one another by one or more ether, ester, amide, urethane, carbonyl and/or sulfonyl linkages, m, n being independently selected from 0, 1, 2, 3, 4, 5 or 6 with the proviso that n+m is greater 0, that is that at least one A group is present.

Such polymerizable materials include mono-, di- or polyacrylates and methacrylates such as methyl acrylate, methyl methacrylate, ethyl (meth)acrylate, isopropyl (meth)acrylate, n-hexyl (meth)acrylate, stearyl (meth)acrylate, allyl (meth)acrylate, glycerol di(meth)acrylate, diurethane dimethacrylate, sometimes referred to as UDMA (mixture of isomers, e.g. Röhm Plex™ 6661-0) being the reaction product of 2-hydroxyethyl methacrylate (HEMA) and 2,2,4-trimethylhexamethylene diisocyanate (TMDI), glycerol tri(meth)acrylate, ethyleneglycol di(meth)acrylate, diethyleneglycol di(meth)acrylate, triethyleneglycol di(meth)acrylate, 1,3-propanediol diacrylate, 1,3-propanediol dimethacrylate, trimethylolpropane tri(meth)acrylate, 1,2,4-butanetriol tri(meth)acrylate, 1,4-cyclohexanediol di(meth) acrylate, pentaerythritol tri(meth)acrylate, pentaerythritol tetraacrylate, pentaerythritol tetramethacrylate, sorbitol hexa(meth)acrylate, bis[1-(2-(meth)acryloxy)]-p-ethoxyphenyldimethylmethane, bis[1-(3-methacryloxy-2-hydroxy)]-p-propoxyphenyldimethylmethane (BisGMA), bis[1-(3-methacryloxy)]-p-propoxyphenyldimethylmethane, dimethacrylates of ethoxylated bisphenol A with 2-10 ethoxy units (e.g. BisEMA-6) and trishydroxyethyl-isocyanurate trimethacrylate; bis-acrylates and bis-methacrylates of polyethylene glycols of molecular weight 200-500, copolymerizable mixtures of acrylated monomers (see e.g. U.S. Pat. No. 4,652,274 (Boettcher et al.)), and acrylated oligomers (see e.g. U.S. Pat. No. 4,642,126 (Zador et al.)); and vinyl compounds such as styrene, diallyl phthalate, divinyl succinate, divinyl adipate and divinylphthalate; polyfunctional (meth)acrylates comprising urethane, urea or amide groups.

Examples of polyether (meth)acrylates include dialkylene glycol mono(meth)acrylate, for example, diethylene glycol mono(meth)acrylate, triethylene glycol mono(meth)acrylate, tetraethylene glycol mono(meth)acrylate, polyethylene glycol mono(meth)acrylate, dipropylene glycol mono(meth) acrylate, polypropylene glycol mono(meth)acrylate, and the like.

The molecular weight (Mw) of these compounds is typically less than 20,000 g/mol, particularly less than 15,000 g/mol, and in particular less than 10,000 g/mol.

Further examples for polymerizable component(s) are the di(meth)acrylate derived from tricyclodecane-dimethanol (which is typically a mixture of isomers), reaction products of tricyclodecane-dimethanol with isocyanatoethyl (meth) acrylate, reaction products of tricyclodecane-diisocyanate with hydroxyethyl (meth)acrylate or hydroxypropyl (meth) acrylate, such as bis[3[4]-methacryl-oxymethyl-8(9)-tricyclo[5.2.1.0$^{2,6}$]decylmethyl triglycolate and urethane (meth) acrylates and di(meth)acrylates of bishydroxymethyltricyclo-(5.2.1.0$^{2,6}$)decane. These kind of methacrylic esters are described in U.S. Pat. No. 4,795,823 (Schmitt et al.).

Polymerizable monomers comprising a hydroxyl moiety can also be added.

Suitable compounds include 2-hydroxyethyl methacrylate (HEMA), 2- or 3-hydroxypropyl (meth)acrylate, 4-hydroxybutyl (meth)acrylate, 5-hydroxypentyl (meth)acrylate, 6-hydroxyhexyl (meth)acrylate, 10-hydroxydecyl (meth)acrylate, 1,2- or 1,3- and 2,3-dihydroxypropyl (meth)acrylate, 2-hydroxypropyl-1,3-di(meth)acrylate, 3-hydroxypropyl-1,2-di(meth)acrylate, N-(meth)acryloyl-1,2-dihydroxypropylamine, N-(meth)acryloyl-1,3-dihydroxypropylamine, 1-phenoxy-2-hydroxypropyl (meth)acrylate, 1-naphthoxy-2-hydroxypropyl (meth)acrylate. 2-Hydroxyethyl (meth) acrylate, 2-hydroxypropyl (meth)acrylate and 2,3-dihydroxypropyl (meth)acrylate are sometimes preferred.

The polymerizable component without an acidic moiety is typically present in either of the following amount(s): Lower limit: at least 10 or at least 20 or at least 30 wt. %; Upper limit: utmost 70 or utmost 60 or utmost 50 wt. %; Range: 10 to 70 or 20 to 60 or 30 to 50 wt. %; wt. % with respect to the amount of the curable composition.

The curable composition described in the present text typically also comprises an initiator system for curing the curable composition.

The initiator system is typically present in an amount of 0.01 to 5 or 0.1 to 4 or 0.5 to 3 wt. % with respect to the weight of the curable composition.

The initiator system can comprise a photo-initiator system or a redox-initiator system, or a combination of both.

According to one embodiment, the initiator system comprises a photo-initiator or a photo-initiator system.

The photo-initiator should be able to start or initiate the curing or hardening reaction of the curable component(s) being present in the curable composition.

The photo-initiator typically shows a light absorption band in a wavelength range of 330 to 495 nm.

Suitable photo-initiator systems for free radical polymerization are generally known to the person skilled in the art dealing with dental materials.

Suitable photo-initiator systems often contain a sensitizer comprising alpha-alpha di-keto moiety, an anthraquinone moiety, a thioxanthone moiety or benzoin moiety. Sensitizers containing an alpha-alpha di-keto moiety are often preferred.

Examples of sensitizers which can be used include camphor quinone, benzil, diacetyl, benzyl dimethyl ketal, benzyl diethyl ketal, benzyl di(2-methoxyethyl) ketal, 4,4,'-dimethylbenzyl dimethyl ketal, anthraquinone, 1-chloroanthraquinone, 2-chloroanthraquinone, 1,2-benzanthraquinone, 1-hydroxy-anthraquinone, 1-methylanthraquinone, 2-ethylanthraquinone, 1-bromoanthraquinone, thioxanthone, 2-isopropyl thioxanthone, 2-nitrothioxanthone, 2-methyl thioxanthone, 2,4-dimethyl thioxanthone, 2,4-diethyl thioxanthone, 2,4-diisopropyl thioxanthone, 2-chloro-7-trifluoromethyl thioxanthone, thioxanthone-10,10-dioxide, thioxanthone-10-oxide, benzoin methyl ether, benzoin ethyl ether, isopropyl ether, benzoin isobutyl ether, benzophenone, bis(4-dimethylaminophenyl)ketone, 4,4,'-bisdiethylamino-benzophenone.

Typical photo-initiator systems comprise a combination of a sensitizer and a reducing agent or donor component, which is often referred to as photo-initiator system.

As the reducing agent or donor component, tertiary amines and the like are generally used. Suitable examples of the tertiary amines include N,N-dimethyl-p-toluidine, N,N-dimethylaminoethyl methacrylate, triethanolamine, methyl 4-dimethylaminobenzoate, ethyl 4-dimethylaminobenzoate, methyldiphenylamine and isoamyl 4-dimethylaminobenzoate.

Alternatively or in addition, the photo-initiators may also contain a phosphine oxide moiety.

Examples of light curing initiator components include the class of acylphosphine oxides and bisacylphosphine oxides.

Such acylphosphine oxides are of the general formula

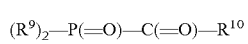

$(R^9)_2$—P(=O)—C(=O)—$R^{10}$ wherein each $R^9$ individually can be a hydrocarbyl group such as alkyl, cycloalkyl, aryl, and aralkyl, any of which can be substituted with a halo-, alkyl- or alkoxy-group, or the two $R^9$ groups can be joined to form a ring along with the phosphorous atom, and wherein $R^{10}$ is a hydrocarbyl group, an S—, O—, or N-containing five- or six-membered heterocyclic group, or a —Z—C(=O)—P(=O)—$(R^9)_2$ group, wherein Z represents a divalent hydrocarbyl group such as alkylene or phenylene having from 2 to 6 carbon atoms.

Preferred acylphosphine oxides are those in which the $R^9$ and $R^{10}$ groups are phenyl or lower alkyl- or lower alkoxy-substituted phenyl. By "lower alkyl" and "lower alkoxy" is meant such groups having from 1 to 4 carbon atoms.

Tertiary amine reducing agents may be used in combination with an acylphosphine oxide. Illustrative tertiary amines include ethyl 4-(N,N-dimethylamino)benzoate and N,N-dimethylaminoethyl methacrylate.

Commercially-available phosphine oxide photo-initiators include a 25:75 mixture, by weight, of bis(2,6-dimethoxybenzoyl)-2,4,4-trimethylpentyl phosphine oxide and 2-hydroxy-2-methyl-1-phenylpropan-1-one (previously known as IRGACURE™ 1700, Ciba Specialty Chemicals), 2-benzyl-2-(N,N-dimethylamino)-1-(4-morpholinophenyl)-1-butanone (previously known as IRGACURE™ 369, Ciba Specialty Chemicals), bis(η5-2,4-cyclopentadien-1-yl)-bis (2,6-difluoro-3-(1H-pyrrol-1-yl)phenyl) titanium (previously known as IRGACURE™ 784 DC, Ciba Specialty Chemicals), a 1:1 mixture, by weight, of bis(2,4,6-trimethylbenzoyl)phenyl phosphine oxide and 2-hydroxy-2-methyl-1-phenylpropane-1-one (previously known as DAROCUR™ 4265, Ciba Specialty Chemicals), and ethyl-2,4,6-trimethylbenzylphenyl phosphinate (LUCIRIN™ LR8893X, BASF Corp., Charlotte, NC), 2,4,6-trimethylbenzoyldiphenyl-phospine oxide (LUCIRIN™ TPO), wherein 2,4,6-trimethylbenzoyldiphenyl-phospine oxide is often preferred.

Exemplary UV initiators include 1-hydroxycyclohexyl benzophenone (previously known as "IRGACURE 184" from Ciba Specialty Chemicals Corp., Tarrytown, NY), 4-(2-hydroxyethoxy)phenyl-(2-hydroxy-2-propyl) ketone (previously known as "IRGACURE 2529" from Ciba Specialty Chemicals Corp.), 2-hydroxy-2-methylpropiophenone (previously known as "DAROCURE D111" from Ciba Specialty Chemicals Corp. and bis(2,4,6-trimethylbenzoyl)-phenylposphineoxide (previously known as "IRGACURE 819" from Ciba Specialty Chemicals Corp.).

If present, the photo-initiator(s) is typically present in either of the following amounts: Lower limit: at least 0.01 or at least 0.05 or at least 0.1 wt. %; Upper limit: at most 3 or at most 2 or at most 1.5 wt. %; Range: 0.01 to 3 or 0.05 to 2 wt. % or 0.1 to 1.5 wt. %; wt. % with respect to the weight of the whole curable composition.

Another alternative class of initiators capable of initiating polymerization of free radically active functional groups includes conventional chemical initiator systems such as a combination of a peroxide and an activator such as an amine.

These initiators, which rely upon a redox reaction, are often referred to as "auto-cure catalysts." They are typically supplied as two-part systems in which the reactants are stored apart from each other and then combined immediately prior to use.

In particular, peroxide compounds (including hydro-peroxide(s), ketone peroxide(s), diacyl peroxide(s), dialkyl peroxide(s), peroxyketal(s), peroxyester(s) and peroxydicarbonate(s))) or persulfates can be used.

Suitable as activators are, for example, tertiary aromatic amines, such as the N,N-bis-(hydroxyalkyl)-3,5-xylidines (e.g. described in U.S. Pat. No. 3,541,068) as well as N,N-bis-(hydroxyalkyl)-3,5-di-t-butylanilines, in particular N,N-bis-([beta]-oxybutyl)-3,5-di-t-butylaniline as well as N,N-bis-(hydroxyalkyl)-3,4,5-trimethylaniline.

Well-suited activators are also the barbituric acids components (e.g. those described in US 2003/008967) as well as malonyl sulfamide components (e.g. those described in U.S. Pat. No. 4,544,742).

For further acceleration, the polymerization can be carried out in the presence of heavy-metal compounds and ionogenic halogen or pseudohalogen.

The heavy metal is suitably used in the form of soluble organic compounds. Likewise, the halide and pseudohalide ions are suitably used in the form of soluble salts, as examples there can be named the soluble amine hydrochlorides as well as quarternary ammonium chloride compounds. Suitable accelerators are in particular metals from the iron or copper group, preferably copper and iron complexes and in particular copper complexes. The heavy metal is preferably employed in the form of soluble organic compounds. Suitable are, for example, iron carboxylates, copper carboxylates, iron procetonate, copper procetonate, copper naphthenate, copper acetate and iron naphthenate.

In a further alternative, heat may be used to initiate the hardening, or polymerization, of free radically active groups.

This class of initiators is sometimes referred to as thermal initiators. Examples include peroxides such as, for example, benzoyl peroxide and lauryl peroxide, and azo compounds such as, for example, 2,2-azobis-isobutyronitrile (AIBN).

The curable composition described in the present text typically comprises a filler matrix.

The filler matrix is typically present in the curable composition in an amount of 5 to 45 wt. % or 10 to 40 wt. %.

The amount of filler used may have an impact on the viscosity of the curable composition, and the abrasion resistance of the cured composition or both.

The filler matrix may comprise fumed silica.

The specific surface (BET) of the fumed silica is typically in the range of 100 to 300 m$^2$/g or from 150 to 250 m$^2$/g. A mixture of different fumed silica can be used, if desired.

E.g. a mixture of fumed silica the surface of which has been treated with a hydrophobic surface treating agent and fumed silica the surface of which has been treated with a hydrophilic surface treating agent can be used.

Suitable hydrophobic surface-treating agents include: —OSiR$_3$, with R being selected from C$_{1-4}$ alkyl, preferably methyl and mixtures thereof. Hydrophobic fumed silica is also commercially available under the trade designations HDK, in particular HDK-H™ 2000 (Wacker), or Aerosil™ R812 (Evonik).

If present, fumed silica is typically present in either of the following amounts: Lower limit: at least 0.5 or at least 1 or at least 1.5 wt. %; Upper limit: utmost 8 or utmost 7 or utmost 5 wt. %; Range: 0.5 to 8 or 1 to 7 or 1.5 to 5 wt. %; wt. % with respect to the weight of the curable composition.

The filler matrix may also comprise nanocluster(s).

One or more different kinds of nanocluster(s) can be present.

It was found that compared to other fillers, using nanocluster(s) can be beneficial because it allows the formulation of a composition with high filler load resulting typically in better mechanical properties.

The nanocluster can typically be characterized by at least one or all of the following features:

Specific surface (BET): 30 to 400 or 60 to 300 or 80 to 250 m²/g, comprising particles of $SiO_2$, $ZrO_2$, $Al_2O_3$ and mixtures thereof.

If desired, the specific surface can be determined according to Brunauer, Emmet and Teller (BET) by using a device (Monosorb™) available from Quantachrome.

A suitable nano-filler comprising aggregated nano-sized particles can be produced according to the processes described e.g. in U.S. Pat. No. 6,730,156 (preparatory example A).

A useful nano-filler comprising aggregated nano-sized particles can be prepared from a suitable sol and one or more oxygen containing heavy metal compound solution(s) precursors which may be salts, sols, solutions, or nano-sized particles; of these, sols are preferred.

If desired, the surface of the filler particles can be surface treated. The surface-treatment can be accomplished according to a process as described in U.S. Pat. No. 6,730,156 (Windisch et al.) or U.S. Pat. No. 6,730,156 (Wu et al.). The content of these references is herewith incorporated by reference.

Once dispersed in the resin, the filler remains in an aggregated stage. That is, during the dispersion step the particles do not break up into discrete (i.e. individual) and un-associated (i.e. non-aggregated) particles.

If present, the nanocluster(s) are typically present in either of the following amounts: Lower limit: at least 5 or at least 10 or at least 15 wt. %; Upper limit: utmost 40 or utmost 38 or utmost 35 wt. %; Range: 5 to 40 or 10 to 38 or 15 to 35 wt. %; wt. % with respect to the weight of the curable composition.

Besides (meth)acrylate components without acidic groups, the curable composition may also contain (meth) acrylate components with acidic groups.

Adding (meth)acrylate components with acidic groups typically may enhance the etching and bonding properties of the curable composition to the inner surface of the dental article.

The polymerizable component having an acidic moiety can be represented by the following formula $A_nBC_m$ B being a backbone group, such as (i) linear or branched $C_1$ to $C_{12}$ alkyl, optionally substituted with OH, (ii) $C_6$ to $C_{12}$ aryl, optionally substituted with OH, (iii) organic group having 4 to 20 carbon atoms bonded to one another by one or more ether, thioether, ester, thioester, thiocarbonyl, amide, urethane, carbonyl and/or sulfonyl linkages, each optionally substituted with OH, A being an ethylenically unsaturated group attached to the backbone group, such as a (meth)acryloyl moiety, C being an acidic group attached to the backbone group, with m, n=1, 2, 3, 4, 5 or 6, wherein the acidic group comprises one or more carboxylic acid or anhydride residues, such as —COOH or —CO—O—CO—, phosphoric acid residues, such as —O—P(O)(OH)OH, phosphonic acid residues or sulfonic acid residues, such as —SO₃H or sulfinic acid residues, such as —SO₂H.

Specific examples of ethylenically unsaturated acidic compounds include, but are not limited to glycerol phosphate mono(meth)acrylates, glycerol phosphate di(meth) acrylates, hydroxyethyl (meth)acrylate phosphates, bis glycerol phosphate di(meth)acrylates, bis((meth)acryloxyethyl) phosphate, ((meth)acryloxypropyl) phosphate, bis((meth) acryloxypropyl) phosphate, bis((meth)acryloxy)propyloxy phosphate, (meth)acryloxyhexyl phosphate, bis((meth)acryloxyhexyl) phosphate, (meth)acryloxyoctyl phosphate, bis ((meth)acryloxyoctyl) phosphate, (meth)acryloxydecyl phosphate, bis((meth)acryloxydecyl) phosphate, caprolactone methacrylate phosphate, di or tri(meth)acrylated citric acid, poly(meth)acrylated oligomaleic acid, poly(meth)acrylated polymaleic acid, poly(meth)acrylated poly(meth) acrylic acid, poly(meth)acrylated polycarboxyl-polyphosphonic acid, poly(meth)acrylated polychlorophosphoric acid, poly(meth)acrylated polysulfonate, poly(meth)acrylated polyboric acid, and the like.

The reaction products of (meth)acrylic acid with alkane diols (e.g. $C_2$ to $C_{20}$ or $C_2$ to $C_{12}$ or $C_6$ to $C_{10}$) and phosphorous oxide were found to be suitable as well.

Also monomers, oligomers, and polymers of unsaturated carboxylic acids such as (meth)acrylic acids, aromatic (meth)acrylated acids (e.g., methacrylated trimellitic acids), and anhydrides thereof can be used.

Some of these compounds can be obtained, e.g., as reaction products between isocyanatoalkyl (meth)acrylates and carboxylic acids. Additional compounds of this type having both acid-functional and ethylenically unsaturated components are described in U.S. Pat. No. 4,872,936 (Engelbrecht) and U.S. Pat. No. 5,130,347 (Mitra). A wide variety of such compounds containing both the ethylenically unsaturated and acid moieties can be used. If desired, mixtures of such compounds can be used.

Additionally, ethylenically unsaturated compounds with acid functionality include, for example, polymerizable bisphosphonic acids as disclosed for example in US 2004/0206932 A1 (Abuelyaman); AA:ITA:IEM (copolymer of acrylic acid:itaconic acid with pendent methacrylate made by reacting AA:ITA copolymer with sufficient 2-isocyanatoethyl methacrylate to convert a portion of the acid groups of the copolymer to pendent methacrylate groups as described, for example, in Example 11 of U.S. Pat. No. 5,130,347 (Mitra)); and those recited in U.S. Pat. No. 4,259,075 (Yamauchi et al.), U.S. Pat. No. 4,499,251 (Omura et al.), U.S. Pat. No. 4,537,940 (Omura et al.), U.S. Pat. No. 4,539,382 (Omura et al.), U.S. Pat. No. 5,530,038 (Yamamoto et al.), U.S. Pat. No. 6,458,868 (Okada et al.), and EP 0 712 622 A1 (Fuchigami et al.) and EP 1 051 961 A1 (Hino et al.).

Typical compositions also include an ethylenically unsaturated acidic compound with at least one phosphoric acid group (e.g. P—OH moiety).

Examples of preferred phosphoric acid group-containing polymerizable monomer include 6-(meth)acryloxyhexyl dihydrogenphosphate, 7-(meth)acryloxyheptyl dihydrogenphosphate, 8-(meth)acryloxyoctyl dihydrogenphosphate, 9-(meth)acryloxynonyl dihydrogenphosphate, 10-(meth) acryloxydecyl dihydrogenphosphate, 11-(meth)acryloxyundecyl dihydrogenphosphate, 12-(meth)acryloxydodecyl dihydrogenphosphate, 16-(meth)acryloxyhexadecyl dihydrogenphosphate, 20-(meth)acryloxyeicosyl dihydrogenphosphate, bis[6-(meth)acryloxyhexyl] hydrogenphosphate, bis[8-(meth)acryloxyoctyl] hydrogenphosphate, bis[9-(meth)acryloxynonyl] hydrogenphosphate, bis[10-(meth) acryloxydecyl] hydrogenphosphate, 1,3-di(meth)acryloxypropyl dihydrogenphosphate, 2-(meth)acryloxyethylphenyl hydrogenphosphate, 2-(meth)acryloxyethyl-2-bromoethyl hydrogenphosphate, (5-methacryloxy)pentyl-3-phosphonopropionate, (6-methacryloxy)hexyl-3-phosphonopropionate, (10-methacryloxy)decyl-3-phosphonopropionate, (6-methacryloxy)hexyl-3-phosphonoacetate, (10-methacryloxy)decyl-3-phosphonoacetate, 2-methacryloxyethyl (4-methoxyphenyl) hydrogenphosphate and 2-methacryloxypropyl (4-methoxyphenyl) hydrogenphosphate and mixtures thereof.

Mixtures of different components comprising an acidic moiety can be used, if desired.

The presence of polymerizable component(s) with an acidic moiety helps to increase the etching properties of the composition.

If present, the (meth)acrylate component(s) with an acidic group are typically present in either of the following amounts: Lower limit: at least 0.5 or at least 1 or at least 2 wt. %; Upper limit: utmost 20 or utmost 15 or utmost 10 wt. %; Range: 0.5 to 20 or 1 to 15 or 2 to 10 wt. %; wt. % with respect to the amount of the curable composition.

Adding solvent(s) or co-solvent(s) may help to adjust the viscosity and consistency of the curable composition.

Examples of solvents include, but are not limited to linear, branched or cyclic, saturated or unsaturated alcohols, ketones, esters, ethers or mixtures of two or more of said type of solvents with 2 to 10 C atoms. Preferred alcoholic solvents include methanol, ethanol, iso-propanol and n-propanol.

Other suitable organic solvents are THF, acetone, methyl ethyl ketone, cyclohexanol, toluene, alkanes and acetic acid alkyl esters, in particular acetic acid ethyl ester.

It is possible to use the above-mentioned solvents alone or as a mixture of two or more of any of these solvents, if the solvent mixtures do not impair the adhesive properties to such an extent that the desired result cannot be obtained.

If present, the solvent(s) are typically present in either of the following amounts: Lower limit: at least 1 or at least 2 or at least 5 wt. %; Upper limit: utmost 20 or utmost 15 or utmost 10 wt. %; Range: 1 to 20 or 2 to 15 or 5 to 10 wt. %; wt. % with respect to the amount of the curable composition.

Additives of adjuvants which can be present in the curable compositions typically include fluoride release agents, dyes, stabilizers, and combinations thereof.

If present, additive(s) are present in either of the following amounts: Lower limit: at least 0.01 or at least 0.1 or at least 0.2 wt. %; Upper limit: utmost 5 or utmost 4 or utmost 3 wt. %; Range: 0.01 to 5 or 0.1 to 4 or 0.2 to 3 wt. %; wt. % with respect to the amount of the curable composition.

The curable composition can be obtained by mixing the respective components, preferably under save-light conditions.

A typical curable composition may comprise or essentially consists of or consist of the following components:

(meth)acrylate component(s) without acidic group(s): 10 to 70 wt. %,
(meth)acrylate component(s) with acidic group(s): 0.5 to 20 wt. %,
 initiator system: 0.01 to 5 wt. %,
 filler(s): 5 to 45 wt. %,
 optionally solvent(s): 1 to 20 wt. %,
 optionally additive(s) 0.01 to 5 wt. %,
wt. % with respect to the weight of the curable composition.

The process described in the present text further comprises the step of applying particles to the treated inner surface of the non-metallic dental article.

That is, not the whole surface of the non-metallic dental article is treated, but only that surface (or portions thereof) which is intended to be adhered or fixed to the surface of a tooth. A suitable portion or part of the surface of the non-metallic dental article to be treated is typically in a range of 10 to 80% or 20 to 70% or 30 to 60%.

The treating step with the particles is adjusted to achieve e.g. a surface roughness of the non-metallic dental article in the range of 1 to 30 µM (Ra) or 2 to 20 µm (Ra).

A surface roughness in this range can be beneficial to facilitate the bonding or adhesion of other materials or compositions to the surface of the non-metallic dental article.

However, if the surface roughness becomes too high, the fitting of the non-metallic dental article to the surface of a tooth might be negatively affected.

The treating step of the inner surface is done in a manner to enable at least a portion of the particles to become partially embedded in the curable composition.

The adjusting of the treating step typically involves the selection of suitable particles with a desired particle size and parameters suitable for processing these particles (e.g. application pressure, duration, particle flow rate). A pre-selection of suitable parameters is often already provided by the device used for the surface treating process.

The particles can be applied to the layer of curable composition located on the surface of the non-metallic dental article in various means.

A suitable means is the use of a gas stream. Such a treating step can be regarded as a kind of sandblasting or powder jetting. Devices which can be used for applying particles under pressure to a surface are commercially available, e.g. Rocatec™ (3M Oral Care), Basic classic (Renfert), Airflow™ (EMS).

If the particles are applied with a gas stream, a suitable working pressure is typically in the range of 0.5 to 500 kPa (5 bar) or 1 to 300 kPa.

A suitable flow rate for the particles is typically in a range of 0.01 to 10 g/s or 0.02 to 6 g/s (e.g. for a working pressure of 2 bar).

If applied with a gas stream, the particles are typically applied for a time sufficient to achieve the desired surface roughness. A time period in the range of 0.1 to 10 s or 1 to 5 s or 1 to 2 s per $cm^2$ surface area to be treated is considered sufficient.

Alternatively, the sandblasting or powder-jetting device may be vibrated during the treatment step to avoid an undesired caking of the particles used for the particle treatment.

The particles can also be applied by other means, e.g. by a coating process.

In such a process, the particles are typically applied without using a gas stream, but by using coating equipment such as a powder dosing unit in combination with a roller, if desired. E.g., the coating process can be done by slightly pressing the treated surface of the non-metallic dental article into the particles.

In contrast to the process described in the present text, the sandblasting of the surface of a cleaned and fully cured non-metallic dental article for the purpose of surface-roughening will not result in the incorporation or embedding of particles into the surface of the dental article.

The presence of the particles in the surface of the non-metallic dental article can be determined by various techniques, e.g. by microscopy or XRF analysis, if desired.

According to a further embodiment, the particles are simply placed on the treated surface of the non-metallic dental article, e.g. by spreading or pouring.

If the non-metallic dental article has e.g. a concave surface region (e.g. inner side of a dental crown), the concave region may be filled with the particles in a first step.

In a further step, the non-metallic dental article is turned around so that the particles, which did not adhere to the curable composition located on the surface, simply fall down.

To improve the fixing process of the particles into the curable composition pressure can be used in addition, if desired.

The properties and chemical composition of the particles to be used for the treating step are not particularly limited, unless the particles are not suitable for the intended use.

The particles are composed of either an inorganic material or an organic material, or a mixture of both. The use of an inorganic material is sometimes preferred.

The particles used for the surface-modification are not coated with a thermosetting or thermoplastic resin. Using particles which are not coated with a thermosetting or thermoplastic resin is advantageous, as such particles can typically be processed by a sandblasting device more easily as the tendency that the particles stick together is typically reduced.

Suitable particles can be characterized by the following features alone or in combination: particle size (d50): 1 to 150 µm; density: 2 to 8 g/cm$^3$.

Particles with the following features can also be used: particle size (d50): 10 to 150 µm; density: 2 to 8 g/cm$^3$.

Particles with the following features can also be used: particle size (d50): 2 to 100 µm; density: 2 to 8 g/cm$^3$.

Particles with the following features can also be used: particle size (d50): 2 to 50 µm; density: 2 to 8 g/cm$^3$.

A particle size in the above range is often beneficial as larger particles (that is, particles with a particle size of 1 µm or above) can typically be embedded in the curable composition more easily compared to smaller particles. Further, the handling and processing of particles having a larger particle size is often less complicated.

It can also be preferred, if the size of the particles used for the treatment process is larger than the thickness of the layer of the curable composition on the surface of the dental article.

In such a case it can be easily ensured that the particles are only partially embedded in the layer of the curable composition. The non-embedded part of the particles then protrudes from the surface and is accessible to the surroundings.

Depending on the nature and/or chemical composition of the particles, the particles may be used as a connector or reaction partner for other compositions which are applied to the surface of the 3-dimensional article later.

Using particles with a density in the above range is also considered beneficial as the processing of such particles is typically easier. E.g., if these particles are processed with a sandblasting device, there will be a larger impulse or momentum. Particles with a density above 2 g/cm$^3$ are often composed of inorganic components.

By density is meant the density of a compacted homogeneous non-porous material. The respective numbers are typically provided by the supplier of the respective material or can be taken from scientific textbooks. If desired, the density can be measured by applying the Archimedes principle.

Particles which can be used include inorganic particle comprising glass powder, metal oxide, metal hydroxide powder and mixtures thereof, organic particles comprising ground polymers, polymethacrylate, polymethyl methacrylate (PMMA), and mixtures thereof, and inorganic-organic composite particles.

Glass powder include e.g. so-called acid-reactive glasses which are commonly used for producing glass ionomer cement compositions. Acid-reactive glasses are known in the art and are also commercially available, e.g. from Schott.

Using acid-reactive glasses can be beneficial, if it is intended to adhesively fix the non-metallic dental article to a surface (e.g. tooth surface) with a dental cement, in particular a glass ionomer cement.

Typical acid-reactive glasses include aluminosilicate glasses and in particular, fluoro alumina-silicate ("FAS") glasses. FAS glasses are sometimes preferred. The glass can be made from a melt containing fluoride, silica, alumina, and other glass-forming ingredients using techniques familiar to those skilled in the FAS glassmaking art.

Suitable FAS glasses are familiar to those skilled in the art and are available from a wide variety of commercial sources, and many are found in currently available glass ionomer cements such as those commercially available under the trade designations Ketac™-Molar or Ketae™-Fil Plus (3M Oral Care), and FUJITM™ IX (GC).

Fluoro aluminosilicate glasses can be prepared by fusing mixtures of silica, alumina, cryolite and fluorite. Metal oxide or hydroxide powder which can be used include the oxides or hydroxides of Al, Si, Zr, Ba, Sr, Ca, Mg, Zn and mixtures thereof.

Using particles with a polar surface such as metal oxide, metal hydroxide or glass powders can be beneficial, if the surface of the non-metallic dental article should become more hydrophilic. If desired, the particles can be surface treated, e.g. silanized.

Suitable organic particles are commercially available from e.g. Evonik, Arkema, or Mitsubishi Chemical. Ground polymer particles can be obtained by providing a curable composition comprising polymerizable monomers, oligomers and/or polymers, curing the composition and grinding the obtained polymer.

Inorganic-organic composite particles can be prepared by curing a mixture of a particulate inorganic filler with a polymerizable resin comprising e.g. methacrylate or acrylate monomers and pulverizing the cured mixture. A suitable process is described e.g. in U.S. Pat. No. 6,221,931 (Sakuma et al.).

To improve the processing and transporting of the particles in a sandblasting or powder jetting device, the addition of free-flow or anti-caking agents can be advantageous.

Suitable free-flow or anti-caking agents include silica powder (e.g. Aerosil™ from Evonik, including OX 50, 130, 150 and 200; HDK™ from Wacker, including H15, H20, H200), silicate powder, or talcum powder and mixtures thereof.

These free-flow or anti-caking agents typically have a particle size (d50) in the range of 10 to 500 nm or 10 to 200 nm.

If a free-flow or anti-caking agent is used, the treatment step is done with a mixture of particles, i.e. a particle composition comprising large and small particles.

A suitable particle composition may comprise particles with a particle size (d50) of 1 to 150 µm, and particles with a particle size (d50) of 10 to 500 nm.

If a free-flow or anti-caking agent is used, it is typically present in the particle composition in an amount of 0.05 to 5 wt. % or 0.1 to 3 wt. % with respect to the amount of the particle composition.

Depending on the chemical composition of the particles, additional features can be implemented. The process described in the present text allows an easy modification and implementation of different kinds of features or properties to the inner surface of the non-metallic dental article.

Using x-ray visible particles can be beneficial in that this enables the practitioner to better identify the material if placed in the mouth of a patient and to distinguish between sound dental tooth structure and the artificial material. The material becomes radiopaque.

Suitable x-ray visible particles include particles of metal oxides and metal fluorides. Oxides or fluorides of heavy metals having an atomic number greater than about 28 can be preferred. The heavy metal oxide or fluoride should be chosen such that undesirable colours or shading are not imparted to the hardened composition in which it is dispersed. For example, iron and cobalt would not be favoured, as they impart dark and contrasting colours to the neutral tooth colour of the dental material. More preferably, the heavy metal oxide or fluoride is an oxide or fluoride of metals having an atomic number greater than 30. Suitable metal oxides are the oxides of yttrium, strontium, barium, zirconium, hafnium, niobium, tantalum, tungsten, bismuth, molybdenum, tin, zinc, lanthanide elements (i.e. elements having atomic numbers ranging from 57 to 71, inclusive), cerium and combinations thereof. Suitable metal fluorides are e.g. yttrium trifluoride and ytterbium trifluoride. Most preferably, the oxides and fluorides of heavy metals having an atomic number greater than 30, but less than 72 are optionally included in the materials of the invention. Particularly preferred radiopacifying metal oxides include lanthanum oxide, zirconium oxide, yttrium oxide, ytterbium oxide, barium oxide, strontium oxide, cerium oxide, and combinations thereof. Other suitable fillers to increase radiopacity are salts of barium and strontium especially strontium sulphate and barium sulphate.

Using calcium, fluoride and/or phosphate component containing particles can be advantageous to provide the non-metallic dental article with calcium, fluoride and/or phosphate releasing properties.

Particles comprising a calcium and/or phosphate component include calcium (hydrogen) phosphate, tricalcium phosphate, hydroxyl apatite, and mixtures thereof.

Particles comprising a fluoride component include yttrium fluoride, ytterbium fluoride, barium hexafluoro zirconate, sodium fluoride, potassium hexafluorotitanate, and mixtures thereof.

If the particles contain fluorescing components (e.g. Bi containing components, fluorescing pigments) the aesthetics of the dental article can be improved, in particular if the non-metallic dental article has a thin layer/wall thickness.

The process described in the present text further comprises the curing of the treated inner surface of the non-metallic dental article.

This curing step can be performed by heat, radiation, redox-curing or a combination thereof.

By applying the curing step, the curable composition located on the surface of the dental article is cured. By doing this, the particle which have been embedded into the layer of the curable composition are fixed and are firmly connected to the non-metallic dental article.

The means used for curing mainly depend on the chemical formulation of the curable composition.

If the curable composition contains a photo-initiator system, the curing is typically done by applying radiation using a wavelength in the range where the photo-initiator system can be activated.

The curable composition may also contain an initiator system which can be activated by heat.

The curing step can be characterized by the following features alone or in combination:
applying radiation typically with wavelength in the range of 330 to 495 nm;
applying a heating step typically with a temperature in the range of 50 to 200° C. or 50 to 100° C.

If the curable composition contains a redox-initiator system, the curing typically starts as soon as the two components of the redox-initiator system are combined. There is typically no need for applying radiation and/or heat in addition.

If desired, the curing reaction can be supported and/or accelerated, if the curing is done in an environment having a low oxygen content (e.g. below 20 vol. % or below 10 vol. % oxygen) or in an inert atmosphere (e.g. nitrogen or argon) or under reduced pressure (compared to the ambient conditions).

The process described in the present text is for producing a surface-modified a non-metallic dental article, in particular a non-metallic dental restoration.

The invention is also directed to the non-metallic dental article which is obtainable or can be obtained by such a process. Such a non-metallic dental article can be described e.g. as follows:

A dental article made of a composite material with an outer and an inner surface, wherein a layer of a cured composition being different from the chemical composition of the dental article with particles partially embedded therein is located, the layer of cured composition with the partially embedded particles having a surface roughness Ra of 1 to 30 µm,
the curable composition comprising (meth)acrylate components without acidic group(s) and an initiator system for curing the (meth)acrylate components,
the particles being composed of inorganic material,
the particles having a particles size (d50) in the range of 1 to 150 µm.

A dental article made of a plastic material with an outer and an inner surface, wherein a layer of a cured composition being different from the chemical composition of the dental article with particles partially embedded therein is located, the layer of cured composition with the partially embedded particles having a surface roughness Ra of 1 to 30 µm,
the curable composition comprising (meth)acrylate components without acidic group(s), meth)acrylate components with acidic group(s), and an initiator system for curing the (meth)acrylate components,
the particles being composed of inorganic material,
the particles having a particles size (d50) in the range of 1 to 150 µm.

A dental article made of a ceramic material with an outer and an inner surface, wherein a layer of a cured composition being different from the chemical composition of the dental article with particles partially embedded therein is located, the layer of cured composition with the partially embedded particles having a surface roughness Ra of 1 to 30 µm,
the curable composition comprising (meth)acrylate components without acidic group(s), (meth)acrylate components with acidic group(s), and an initiator system for curing the (meth)acrylate components,
the particles being composed of inorganic material,
the particles having a particles size (d50) in the range of 1 to 150 µm.

A dental article made of a glass-ceramic material with an outer and an inner surface, wherein a layer of a cured composition being different from the chemical composition of the dental article with particles partially embedded therein is located, the layer of cured composition with the partially embedded particles having a surface roughness Ra of 1 to 30 µm, the curable composition comprising (meth)acrylate components without acidic group(s), (meth)acrylate components with acidic group(s), and an initiator system for curing the (meth)acrylate components, the particles being composed of inorganic material, the particles having a particles size (d50) in the range of 1 to 150 µm.

According to one embodiment, the process for producing the non-metallic dental article as described in the present text is characterized as follows:

the curable composition comprising (meth)acrylate component(s), photo-initiator(s), filler(s), wherein the filler(s), and having a viscosity in the range of 0.1 to 100 Pa*s at 23° C. and a shear rate of 1 s$^{-1}$, the particles used for the surface-modification being selected from glass powder, metal oxide powder, hydroxide powder and mixtures thereof, wherein the particle size (d50) of the particles contained in the curable composition is smaller than the particle size (d50) of the particles used for the surface modification.

The process described in the present text is in particular useful in the dental and orthodontic field, as dental and orthodontic articles typically have complex structures, which may require certain surface treatments and the fixing of the dental or orthodontic article to a tooth surface.

As an example, the process described in the present text can be used for producing dental restorations, in particular dental restorations having the shape of a dental crown or bridge.

In one embodiment, the non-metallic dental article has the shape of a dental restoration with an outer and an inner surface, wherein only the inner surface of the dental article comprises a layer of a cured or curable composition with particles being partially embedded therein.

According to a preferred embodiment, the non-metallic dental article has the shape of a dental crown.

The shape of a dental crown is typically characterized as follows: The crown has a top surface and depending buccal, respectively labial, mesial, distal, lingual, respectively palatinal side surfaces. The side surfaces are connected to each other and form a crown cervix. The lower region of the crown cervix forms the crown margin or crown rim. The dental crown has an outer and an inner surface. The inner surface is the surface to be attached to a prepared dental tooth. The wall thickness of the crown at the crown cervix (in a distance of 1 mm from the crown margin) is equal to or lower than 0.8 or equal to or lower than 0.7 or equal to or lower than 0.6 mm or in a range of 0.1 to 0.8 mm or 0.1 to 0.7 mm or 0.1 to 0.6 mm or 0.1 to 0.5 mm. The wall thickness of the top surface (occlusal and/or distal) of the preformed crown is typically in the range of 0.15 mm to 1.5 mm or in the range of 0.4 mm to 1.0 mm.

At least two of the opposing and depending side surfaces of the dental composite crown may have a concave shape, preferably the buccal and lingual side surfaces. That is, the side walls of the crown have a curved shape and thus may provide an undercut in the region of the crown cervix. The wall thickness of the side surfaces of the crown is typically not larger than 0.7 mm or 0.6 mm or 0.5 mm or 0.4 mm.

According to one embodiment, the wall thickness of the side surfaces of the preformed crown is in a range of 0.1 mm to 0.7 mm. According to another embodiment, the wall thickness of the side surfaces of the preformed crown is in a range of 0.1 mm to 0.6 mm. According to another embodiment, the wall thickness of the side surfaces of the preformed crown is in a range of 0.1 mm to 0.5 mm. According to a further embodiment, the wall thickness of the side surfaces of the preformed crown is in a range of 0.1 mm to 0.4 mm.

The invention is also directed to the non-metallic dental article described in the present text for use in a method of restoring or treating a tooth, preferably in the mouth of a patient.

This method comprises the steps of providing the non-metallic dental article e.g. having the shape of a dental restoration (in particular the shape of a dental crown or bridge) as described in the present text, and fixing the non-metallic dental article to the surface of the tooth to be treated or restored by using a dental cement.

In particular, if the non-metallic dental article is composed of a rather hydrophobic material such as a dental composite material comprising cured (meth)acrylate components and fillers, the fixing of the non-metallic dental article to the surface of a rather hydrophilic surface (e.g. surface of hard dental tissue) is not trivial.

The fixation of such a non-metallic dental article typically requires additional steps, e.g. a surface roughening of the tooth and/or the inner surface of the dental article to provide retention elements for the dental cement Alternatively, or in addition a so-called self-etching dental adhesive is used, which contains components, which on the one hand can interact with the surface of the composite crown and on the other hand with the surface of the tooth.

By using the non-metallic dental article described in the present text, the fixation process can be simplified as the surface of the dental article has particles embedded therein, which facilitate the fixation process.

The particles may either act as retention element and/or chemically react with components being present in the dental cement.

Thus, the fixing of the surface-modified non-metallic dental article to the surface of the tooth can be supported by a chemical reaction between the particles used for the surface-modification of the inner surface of the non-metallic dental article and one or more components of the dental cement.

Generally, for the fixing of dental crowns and bridges different cementation techniques are available.

These can be divided into clusters like temporary cementation (e.g. RelyX™ TempNE/E, 3M Oral Care), conventional cementation (e.g. Ketac™ CEM or Ketac™ CEM Plus, 3M Oral Care), self-adhesive resin cementation (e.g. RelyX™ Unicem, 3M Oral Care) or adhesive resin cementation (e.g. RelyX™ Ultimate, 3M Oral Care).

In general, the cementation should be durable over the lifetime of the indication, which could be achieved either due to chemical bonding or mechanical retention or a combination thereof.

The choice of the used cement or the general cementation technique for a specific indication is therefore influenced by the material of the restoration, the indication itself, the preparation technique, but also cost and esthetic plays a role.

For a fast and easy chairside workflow with preformed crowns, e.g. pediatric dentistry a fast and easy cementation technique is desired. In this respect different kinds of dental cements can be used.

Suitable dental cements include glass ionomer cements (GIC), resin-modified glass ionomer cements (RMGIC)m adhesive resin cements, self-adhesive resin cements.

Glass ionomer cements are typically provided as a kit of part comprising a liquid part and a powder part. The two parts have to be mixed before use. The powder part typically comprises an acid-reactive inorganic filler (e.g. a fluoro alumosilicate glass, FAS glass). The liquid part typically comprises a polyacid, water and a complexing agent (e.g. tartaric acid). Glass ionomer cements are commercially available (e.g. Ketac™ Cem; 3M Oral Care). The glass ionomer cement can also be provided as a kit of parts comprising two pastes A and B to be mixed before use.

Resin-modified glass ionomer cements typically contain the following components: acid-reactive filler, polyacid, water, complexing agent, radiation curable components, initiator. Suitable radiation curable components typically contain (meth)acrylate moieties. Resin-modified glass ionomer cements are provided as kit of parts as well, either as powder/liquid system or paste/paste system. The powder part typically comprises acid-reactive inorganic filler(s) (e.g. a fluoro alumosilicate glass, FAS glass) and initiator components. The liquid part typically comprises polyacid, water, (meth)acrylates and initiator components. Resin-modified glass ionomer cements are commercially available (e.g. Ketac™ Cem Plus; 3M Oral Care).

(Self) adhesive resin cements typically contain the following components: acidic (meth)acrylate monomers, non-acidic (meth)acrylate monomers, fillers (including acid-reactive fillers), initiator(s), stabilizer(s), solvent(s). Adhesive resin cements are also commercially available (e.g. RelyX™ Ultimate Adhesive Resin Cement; 3M Oral Care).

If the embedded particles are composed of or comprising or consisting of an acid-reactive glass (such as an FAS glass), these particles can react with acidic components contained in the dental cement used for the fixing of the dental article to the surface of a tooth.

As mentioned above, dental cements which contain acidic components include in particular glass-ionomer cements, resin-modified glass-ionomer cements and self-adhesive resin cements.

The invention is also directed to a kit of parts comprising as separate parts at least one non-metallic dental article as described in the present text, in particular a non-metallic dental article having the shape of a dental restoration (e.g. dental crown or dental bridge) and a dental cement, in particular a glass ionomer cement or resin-modified glass ionomer cement, as described in the present text.

Such a kit is in particular useful in a method for restoring or treating a defect tooth.

The invention is also directed to a kit of parts comprising as separate parts
a) a not surface-modified non-metallic dental article or a dental milling block for producing a not surface-modified non-metallic dental article,
b) a curable composition,
c) a powder composition comprising particles,
d) optionally an applicator for the curable composition,
e) optionally an applicator for the powder composition, wherein the curable composition and the particles correspond to the curable composition and the particles described in any the present text, and wherein the not-surface modified non-metallic dental article corresponds to the surface-modified non-metallic dental article as described in present text except for the surface modification.

Such a kit contains elements which enable the practitioner to produce a surface-modified dental article on his own, e.g. in a so-called chair side proceeding, where the dental article is finished while the patient is present.

A dental milling block may be characterized by its shape and/or size. The dental milling block has a shape allowing the milling block to be reversibly attached or fixed to a machining device. Suitable shapes include discs or blocks (e.g. cubic, cuboid, cylinder, etc.).

For a cubic or cuboid shaped blank, typical dimensions are at least 19 mm in 2 dimensions, and at least 12 mm in the third dimension.

Alternatively, a dental milling block having the shape of a cuboid may have the following dimensions: x-dimension: 12 to 45 mm, or 19 to 40 mm; y-dimension: 12 to 70 mm, or 19 to 60 mm; z-dimension: 10 to 40 mm, or 12 to 25 mm.

For a cylindric or disc shaped block, typical dimensions are more than 19 mm in diameter, more than 12 mm in height.

Alternatively, a porous zirconia dental mill blank having the shape of a disc may have the following dimensions: x, y-dimension: 90 to 110 mm, or 95 to 105 mm; z-dimension: 10 to 35 mm, or 12 to 30 mm.

The invention is also directed to the use of the curable composition described in the present text for fixing particles to the inner surface of a non-metallic dental article comprising an inner and an outer surface to obtain a surface roughness Ra of 1 to 30 µm.

In particular, using a curable composition comprising (meth)acrylate components without acidic groups, (meth)acrylate components with acidic groups, a photo-initiator system, filler(s), solvent(s) and additive(s) for fixing particles selected from metal oxides, acid-reactive glass(es) or mixtures thereof was found to be useful.

Further illustrative embodiments of the invention are given below:

Embodiment 1

A non-metallic dental article having the shape of a dental restoration (e.g. crown or bridge) for use in a method of restoring or treating a tooth in the mouth of a patient, the non-metallic dental article having an outer and an inner surface, wherein the inner surface comprises particles partially embedded in a cured composition, the partially embedded particles having a particle size (d50) in the range of 1 to 150 µm, and being selected from or comprising glass particles, metal oxide or hydroxide particles or a combination thereof, the chemical composition of the cured composition being different from the chemical composition of the dental article, the method comprising the steps of
providing the non-metallic dental article,
fixing the non-metallic dental article to the surface of the tooth by using a dental cement, the dental cement being selected from or comprising a glass ionomer cement or resin-modified glass ionomer cement.

Embodiment 2

A non-metallic dental article having the shape of a dental crown or bridge for use in a method of restoring or treating a tooth in the mouth of a patient, the non-metallic dental article having an outer and an inner surface, wherein the inner surface comprises particles partially embedded in a cured composition, the partially embedded particles having a particle size (d50) in the range of 10 to 150 µm, and being selected from or comprising glass particles or metal oxide particles or a combination of both, the chemical composition of the cured composition being different from the chemical composition of the dental article, the cured composition and the material of the dental article comprising filler(s), wherein the filler content of the cured composition is lower than the filler content of the material of the dental article, the method comprising the steps of providing the non-metallic dental article, fixing the dental article to the surface of the tooth by using a dental cement, the dental cement being selected from or comprising a glass ionomer cement or resin-modified glass ionomer cement.

FIG. 1 shows a schematic view of the process described in the present text resulting in a surface-modified non-metallic dental article.

Figure 2:
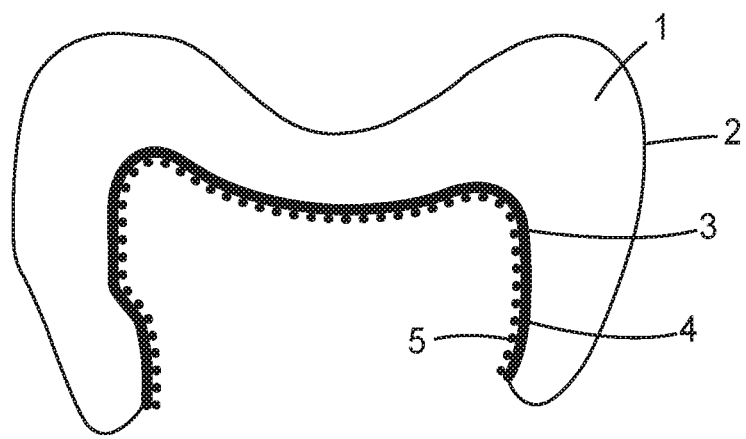
FIG. 2 shows a dental crown having an outer and an inner surface, wherein the inner surface is surface-modified with particles embedded in a curable or cured composition.

In section 1 a surface is shown composed of two regions, a light-grey region and a dark-grey shaded region. The light-grey region represents a surface portion of a non-metallic dental article. The surface portion may be part of a dental composite crown. The dark-grey shaded region represents a surface portion of a curable composition (e.g. comprising (meth)acrylate components), which is not cured yet and sticks to the surface of the non-metallic dental article. Particles shown on the left side of section 1 are applied to the dark-light shaded region (e.g. by using a gas stream or by dropping the particles on the surface). In section 2, the particles are partially embedded in the curable composition (dark-grey shaded region). Section 3 shows the surface region after a curing step has been applied, with partially embedded particles. The previous dark-grey shaded region became dark-grey without shading FIG. 2 shows a schematic cross-section of a dental crown (1). The dental crown has an outer surface (2) and an inner surface (3). On the inner surface (3) there is a layer of a curable composition (4) shown in medium-grey in its cured or curable stage. In the layer (4), particles (5) are partially embedded therein shown in dark-grey.

The curable composition intended to be used for producing the non-metallic dental article described in the present text should not contain components, which are detrimental to a patient's health.

The components used for producing the curable composition and in particular the non-metallic dental articles described in the present text should be sufficiently biocompatible, that is, the composition should not produce a toxic, injurious, or immunological response in living tissue.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate the invention.

EXAMPLES

Unless otherwise indicated, all parts and percentages are on a weight basis, all water is de-ionized water, and all molecular weights are weight average molecular weight. Moreover, unless otherwise indicated all experiments were conducted at ambient conditions.

Methods

Viscosity

If desired, viscosity can be measured using a Physica MCR 301 Rheometer (Anton Paar, Graz, Austria) with a plate/plate geometry under controlled shear rate at 23° C. The diameter is 15 mm, the separation gap between the plates 0.5 mm. The shear rate is ramped from 1,000 $s^{-1}$ to 0.001 $s^{-1}$.

Particle Size (Suitable for Micro-Sized Particles)

If desired, the particle size distribution including the particle size (d50) per volume can be determined by laser diffraction with a Mastersizer 2000 (Malvern) particle size detection device applying the Fraunhofer approximation. During the measurement, ultrasonic is typically used to accurately disperse the sample. For water-insoluble particles, water is typically used as dispersant.

Particle Size (Suitable for Nano-Sized Particles)

If desired, particle size measurements can made using a light scattering particle sizer equipped with a red laser having a 633 nm wavelength of light (obtained under the trade designation "ZETA SIZER—Nano Series, Model ZEN3600" from Malvern Instruments Inc., Westborough, MA). Each sample is analyzed in a one-centimeter square polystyrene sample cuvette. The sample is diluted 1:100, e.g. 1 g of sample is given to 100 g of de-ionized water and mixed. The sample cuvette is filled with about 1 gram of diluted sample. The sample cuvette is then placed in the instrument and equilibrated at 25° C. The instrument parameters are set as follows: dispersant refractive index 1.330, dispersant viscosity 0.8872 mPa*s, material refractive index 1.43, and material absorption value 0.00 units. The automatic size-measurement procedure is then run. The instrument automatically adjusts the laser-beam position and attenuator setting to obtain the best measurement of particle size.

The light scattering particle-sizer illuminates the sample with a laser and analyzes the intensity fluctuations of the light scattered from the particles at an angle of 173 degrees. The method of Photon Correlation Spectroscopy (PCS) can be used by the instrument to calculate the particle size. PCS uses the fluctuating light intensity to measure Brownian motion of the particles in the liquid. The particle size is then calculated to be the diameter of sphere that moves at the measured speed.

The intensity of the light scattered by the particle is proportional to the sixth power of the particle diameter. The Z-average size or cumulant mean is a mean calculated from the intensity distribution and the calculation is based on assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones.

The Volume Distribution gives the percentage of the total volume of particles corresponding to particles in a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average will typically be a smaller value than the Z-average size. In the scope of this document the Z-average size is referred to as "mean particle size".

pH Value

If desired, the pH value of can be determined as follows: 1.0 g of a component (e.g. filler) is dispersed in 10 ml de-ionized water and stirred for about 5 min. A calibrated pH electrode is dipped into the suspension and the pH value is determined during stirring.

Elemental Composition

If desired, the elemental composition can be determined by X-ray fluorescence spectrometry (XRF), e.g. with the ZSX Primus II from Rigaku, Japan. This method is especially suited for the analysis of solids, e.g. zirconia ceramics or glass materials.

Flexural Strength (FS)

If desired, flexural strength can be determined by conducting a three point flexural strength test according to ISO 4049:2019 using test specimen having the size 4*6*25 mm. Flexural strength is given in MPa.

Shear Bond Strength (SBS)

If desired, shear bond strength can be determined as follows: The surface of a stainless-steel cylinder with a diameter of 4 mm and a height of 2 mm are roughened (Rocatec™ Plus, 3M Deutschland GmbH) and silane treated (3M ESPE Sil™, 3M Oral Care). The cylinders are cemented on the substrates using a RMGI cement (RelyX™ luting plus cement, 3M Deutschland GmbH). Therefore, the cement is applied between substrate and cylinder. The cylinder is loaded with 240 g, cement excess is removed and loading kept constant for overall 10 min under 36° C. temperature. The loading is removed and the materials are stored for 22 h at 36° C. and 100% rel. humidity. The SBS is given in MPa.

For the shear bond strength measurement, the substrate is placed in a shear device and stainless-steel cylinder is sheared off with a cross head speed of 0.75 mm/min. The resulting adhesion in MPa is calculated by shearing force [N] divided by surface of the cylinder base surface [mm$^2$]. For each group, n=6 samples are typically tested.

Surface Roughness (Ra)

If desired, the surface roughness Ra can be determined according to EN ISO 4287:2010-07 e.g. using a profilometer Mahr S2 (Mahr GmbH) applying the stylus method. The surface roughness is given in μm. A length of the test track of about 1 cm is considered sufficient.

Materials

TABLE 1

| | | |
|---|---|---|
| Al-Ox 1 | Al$_2$O$_3$ (alpha corundum); particle size (d50): 94 μm | particles |
| Glass ionomer powder (GIP) | Calcium fluoro aluminium silicate glass as described in EP 0 115 058 A2, ground and sieved, particle size (d50): 135 μm | particles |
| SBU | Scotch Bond Universal dental adhesive (3M Oral Care) | curable composition |
| Cement | RelyX ™ Luting plus (3M Oral Care) | dental cement |

Article/Specimen

An article (25 mm×10 mm×5 mm) was produced using a radiation-curable composition essentially as described in WO 2018/231583 A1 (3M), page 48, example 6. Light curing of the article was done with light having a wavelength in the range of 383 nm to 460 nm at 50-500 mW/cm$^2$.

Surface-Modification Process 1:

On one surface of the specimen a thin layer of the curable composition (SBU) was applied using a micro brush. The layer thickness of the curable composition was below 30 μm.

The treated surface was treated with particles by spreading the particles on the curable composition without pressure.

The particle treated surface was light cured for 30 s using a 3M Elipar™ S10 LED Polymerization Device, 3M Oral Care.

Surface-Modification Process 2:

On one surface of the specimen a thin layer of the curable composition (SBU) was applied using a micro brush. The layer thickness of the curable composition was below 30 μm.

The treated surface was treated with particles using a Renfert Basic Quattro sandblasting device (pressure: 2.0-2.5 bar; duration: about 5 s).

The particle treated surface was light cured for 30 s using a 3M Elipar™ S10 LED Polymerization Device, 3M Oral Care.

Surface-Modification Process 3:

One surface of the specimen was treated with particles using a Renfert Basic Quattro sandblasting device (pressure: 2.0-2.5 bar; duration: about 20 s). No curable composition was applied.

The following examnles were conducted and the surface roughness Ra was determined.

| | Inventive Example (IE-1) | Inventive Example (IE-2) | Comparative Example (CE-1) |
|---|---|---|---|
| Particles | GIP | Al-Ox 1 | Al-Ox 1 |
| Surface-Modification Process | 1 | 2 | 3 |
| Surface roughness Ra [μm] | 18 | 6 | 0.5 |

The application of particles without using of a curable composition resulted in only a slight increase of the surface roughness (CE-1).

The application of particles with pressure on a surface treated with a curable composition resulted in a higher increase of the surface roughness (IE-2).

The application of particles with a larger particle size applied without pressure on a surface treated with a curable composition before resulted in an even higher increase of the surface roughness (IE-1).

Due to the presence of partially embedded inorganic particles located on the surface of the treated article, the adhesively fixing or cementing of the article to the surface of a tooth by using a commercially available dental cement becomes more easily and robust.

The particles now can be used to functionally bond to a cement or to retentively improve the cementation robustness.

The particles function as a connecting element in the interface formed by the layer of the curable composition and the dental cement used for fixing the article to the surface of a tooth.

Similar results are expected if instead of the radiation-curable composition used for production of the article in the examples above, a different material for the production of the dental article is used (e.g. PMMA, PEEK, Glass-ceramic, ceramic).

The invention claimed is:

1. A process of producing a surface-modified non-metallic dental article, the process comprising the steps of
providing a non-metallic dental article having an outer and an inner surface, applying a curable composition on the inner surface of the dental article, applying particles on the curable composition located on the inner surface of the dental article to achieve a surface roughness Ra of 1 to 30 μM, curing the applied curable composition, the chemical composition of the curable composition being different from the chemical composition of the non-metallic dental article.

2. The process according to claim 1, wherein the applying of the particles is done in a manner to enable at least a portion of the particles to become partially embedded in the curable composition.

3. The process according to claim 1, wherein the application step of the particles comprises the following steps alone or in combination:
   a) applying the particles with a gas stream with a working pressure in the range of 0.5 to 500 kPa and/or with a particle flow rate in the range of 0.01 to 10 g/s;
   b) applying the particles by coating,
   c) applying the particles by spreading.

4. The process according to claim 1, wherein the curing is effected by the following means alone or in combination: applying radiation, applying heat, redox-curing.

5. The process according to claim 1, the particles being composed of inorganic particles, organic particles, inorganic-organic composite particles or mixtures thereof, and the particles having a particle size d50 in the range of 1 to 150 μM.

6. The process according to claim 1, the particles comprising glass powder, metal oxide powder, metal hydroxide powder, or mixtures thereof.

7. The process according to claim 1, the curable composition being characterized by the following features alone or in combination:
   having a filler content of up to 70 wt. % with respect to the weight of the curable composition;
   comprising (meth)acrylate components.

8. The process according to claim 1, the curable composition comprising
   a) (meth)acrylate components without acidic groups,
   b) an initiator system for curing the (meth)acrylate components,
   c) filler(s),
   d) optionally (meth)acrylate components with acidic groups,
   e) optionally solvent, and
   f) optionally additives.

9. The process according to claim 1, wherein the non-metallic dental article is composed of or comprising a material selected from the group consisting of a composite material, a ceramic material, a glass-ceramic material, and a plastic material.

10. The process according to claim 1,
    wherein the curable composition comprises (meth)acrylate component(s), photo-initiator(s), and filler(s) having a particle size d50, and has a viscosity in the range of 0.1 to 100 Pa*s at 23° C. and a shear rate of 1 $s^{-1}$,
    wherein the particles are selected from the group consisting of glass powder, metal oxide powder, metal hydroxide powder and mixtures thereof,
    and wherein the particle size d50 of the particles of the filler(s) contained in the curable composition is smaller than the particle size d50 of the particles used for the surface modification.

11. A kit of parts comprising
    a) a surface-modified non-metallic dental article, and
    b) a dental cement,
    wherein the surface-modified non-metallic dental article is obtained or obtainable according to the process of claim 1.

* * * * *